United States Patent

Lee

[11] Patent Number: 6,133,942
[45] Date of Patent: Oct. 17, 2000

[54] CO-CHANNEL INTERFERENCE CANCELER AND DRIVING METHOD THEREFOR

[75] Inventor: Myeong-hwan Lee, Suwon, Rep. of Korea

[73] Assignee: Samsung Electronics Co., Ltd., Kyungki-Do, Rep. of Korea

[21] Appl. No.: 08/940,991

[22] Filed: Sep. 30, 1997

[30] Foreign Application Priority Data

May 2, 1997 [KR] Rep. of Korea ............. 97-17055

[51] Int. Cl.$^7$ .................. H04N 5/38; H04N 5/21
[52] U.S. Cl. ........................... 348/21; 348/607
[58] Field of Search ................ 348/607, 609, 348/21, 470, 558, 555, 726, 614; 375/346, 348, 349, 350

[56] References Cited

U.S. PATENT DOCUMENTS

| | | | |
|---|---|---|---|
| 5,546,132 | 8/1996 | Kim et al. | 348/607 |
| 5,594,496 | 1/1997 | Nielsen et al. | 348/21 |
| 5,602,602 | 2/1997 | Hulyalkar | 348/607 |
| 5,793,417 | 8/1998 | Lee | 348/21 |
| 5,798,803 | 8/1998 | Limberg | 348/726 |

*Primary Examiner*—John K. Peng
*Assistant Examiner*—Trang Uyen Tran
*Attorney, Agent, or Firm*—Sughrue, Mion, Zinn, Macpeak & Seas, PLLC

[57] ABSTRACT

A co-channel interference canceler having a co-channel interference rejection filter and a driving method therefor are provided. The co-channel interference canceler is driven for removing co-channel interference of an NTSC signal existing in a co-channel on receiving of an HDTV signal. In doing so, an error rate of a direct signal path which does not pass the rejection filter and an error rate of a signal path passed through the rejection filter are compared. That is, the error rates, obtained for a predetermined period for each path, are compared using a reference signal, to output a driving signal for selecting the path having the smaller error rate. The error rate is obtained by integrating the number of symbol errors between the reference signal and each path signal. Therefore, the driving of the co-channel interference canceler is controlled according to the driving signal based on the error rate, thereby giving simple circuit structure and increased reliability.

22 Claims, 7 Drawing Sheets

FIG. 2A (PRIOR ART)
FIG. 2B (PRIOR ART)
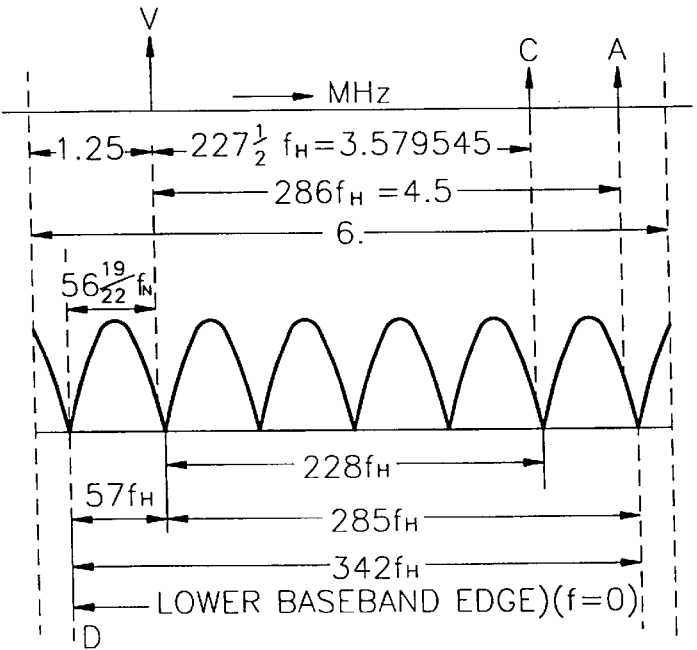
FIG. 2C (PRIOR ART)
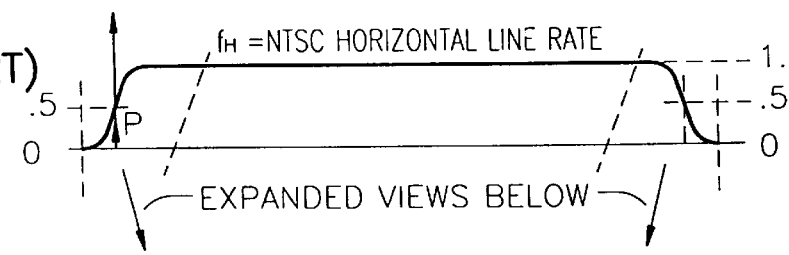
FIG. 2D (PRIOR ART)
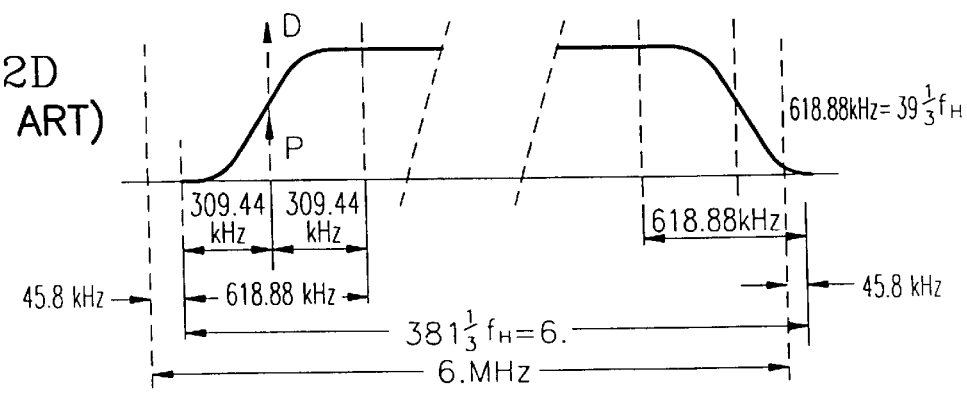

CO-CHANNEL INTERFERENCE CANCELER AND DRIVING METHOD THEREFOR

FIELD OF THE INVENTION

The present invention relates to a receiver for receiving a high resolution signal. More particularly, the invention relates to a co-channel interference canceler including a co-channel interference rejection filter and a driving method therefor.

BACKGROUND OF THE INVENTION

The United States has completed a test of "Grand Alliance-Advanced Television (GA-ATV)" as a digital television transfer system, which is a new television standard capable of replacing the NTSC (National Television System Committee) standard. The GA-ATV system (so-called "GA-HDTV" or "GA-VSB" system), as standardized by the Advanced Television System Committee (ATSC), adopts a vestigial side band (VSB) modulation method as a digital transfer method. Specifically, an 8-VSB using 8 levels is utilized for a terrestrial broadcast mode and a 16-VSB using 16 levels is utilized for a high speed cable mode.

A new ATV signal is transferred together with a conventional analog television signal (NTSC signal) via a television channel which is not in use in a given geographic region ("taboo" channel). Additionally, the new ATV signal may use the same channel as that of an adjacent analog television signal. Accordingly, a GA-VSB receiver must be resistant NTSC co-channel interference. Therefore, when a co-channel and a co-broadcast in which the HDTV signal transfer band of the GA-VSB mode and the NTSC signal transfer band of the current broadcast mode are the same, a method for removing a carrier, in which the energy of a signal is concentrated, is usually used in order to remove the co-channel interference. For example, a comb filter may be used as a representative method. A co-channel interference canceler including a comb filter, and the frequency characteristics of the comb filter, are shown in FIGS. 1 and 2A through 2D, as disclosed in *"Guide to the use of the digital television standard for HDTV transmission"*, pp. 104~107, Doc.A/54, submitted to the United State Advanced Television System Committee, Apr. 12, 1995.

As shown in FIG. 1, a conventional co-channel interference canceler generally includes of a co-channel interference rejection filter (NRF; NTSC rejection filter) 110, a driving signal generator and a selector (MUX) 130. Here, the driving signal generator includes all elements from a subtractor 120 to a minimum energy detector 129.

When an NTSC signal exists in an HDTV channel, the NTSC signal acts as an interference to the HDTV signal. Therefore, since the NTSC signal has a predetermined carrier frequency offset (about 0.89 MHz) with respect to the HDTV signal in a co-channel situation where the HDTV signal and the NTSC signal are simultaneously broadcast, the NRF 110 provides the same effect as if the NTSC signal was modulated by a frequency offset with respect to the HDTV signal in a base band region. In the case of the NTSC signal, all energy is concentrated on an original DC component such as a modulation carrier. Thus, a subtractor 112 in the NRF 110 subtracts a symbol delayed by a 12-symbol delay (12D) 111 from an input symbol (received I channel data symbol) to remove the modulation carrier component, thereby decreasing the effect of the NTSC signal. In the GA-VSB method, a co-channel interference signal is removed using a comb filter having a 12-symbol delay in consideration of the relationship with a precoder of a transmitter.

On the other hand, a comb filter of 6 MHz VSB signal band, as shown in FIG. 2A, has 6 frequency nulls, as shown in FIG. 2B. The NTSC signal, which interferes with the HDTV signal, concentrates its energy on a visual carrier, a chrominance subcarrier and an aural carrier. However, since these carriers are located near frequency notches of the comb filter, the energy of the NTSC signal passed through the comb filter decreases significantly. Thus, the comb filter is excellent in removing the NTSC interference signal and has a simple structure. FIGS. 2C and 2D are diagrams showing band edges for the whole channel in detail.

Although, the comb filter proposed by the ATSC standard is excellent at removing the NTSC interference signal, the structure of the comb filter is characterized by the subtraction between two signals having a full gain, so that the output of the comb filter is increased from an 8-level ($\pm 1$, $\pm 3$, $\pm 5$, $\pm 7$) signal to a 15-level (0, $\pm 2$, $\pm 4$, $\pm 6$, $\pm 8$, $\pm 10$, $\pm 12$, $\pm 14$) signal, and simultaneously the power of the additive Gaussian noise is increased by 3 dB. This results in a 3 dB loss of signal-to-noise ratio (SNR) before and after the comb filter. Further, the performance of a receiving system is degraded by the drop in SNR.

On the other hand, the driving signal generator compares a previously stored field sync reference pattern with a field sync of data symbols being received to determine whether the NTSC signal is mixed with the HDTV signal using the accumulated value of the power (energy) of the difference between the field sync reference pattern and the field sync. Here, the received VSB data frame includes two fields, and a field sync segment, which is the first segment of each field, having a field sync sequence representing the start of the field. Since the field sync sequence has a predetermined shape, the field sync signal is used as a known signal.

The driving signal generator includes a first path portion (120~122), a second path portion (123~128), and a minimum energy detector 129. The first path portion (120~122) compares the reference signal (field sync reference pattern) with the known signal (field sync), without passing through the comb filters 110 and 123, to calculate the accumulated value of the power (energy) of the compared difference. The second path (123~128) compares the received filter sync, filtered by the comb filter 110, with the field sync reference pattern filtered by the comb filter 123, to calculate the accumulated value of power (energy) of the compared difference. The minimum energy detector 129 selects the output of the path portion having less energy, and generates a driving signal NRF_sel for determining whether the NTSC signal is mixed with the HDTV signal. That is, if an NTSC signal is mixed therewith, the energy of the second path passed through the comb filters 110 and 123 is less. Otherwise, the energy of the first path portion which does not pass the comb filters 110 and 123 is less. The driving signal NRF_sel represents whether or not the NTSC signal is included such that the driving signal NRF_sel is a logic "1" if the NTSC signal exists and a logic "0" if the NTSC signal does not exist. The selector 130 selects the received data symbol or the data symbol passed through the comb filter 110, according to the driving signal NRF_sel.

The conventional co-channel interference canceler shown in FIG. 1 selects the result of operating the NRF for removing the co-channel interference, using the energy of the error between the received known signal and the reference signal. However, this method requires a multiplier for calculating the energy, thereby resulting complicated hardware and unreliable decision ability. That is, when an equalizer or an error corrector is attached after the co-channel interference canceler of a general receiver, a real decision error rate is used as a more important basis for the decision than the energy of error. This is because the process performed after the co-channel interference canceler relates to the decision value having a closer relationship with the decision error.

As described above, the comb filter which is used as the co-channel interference rejection filter can remove the co-channel interference. However, other interference sources such as ghost may cause the comb filter to operate abnormally, even though co-channel interference does not exist. The performance is attenuated by about 3 dB when the comb filter operates for noise removal. Thus, for optimizing the performance of the system, the comb filter must operate only when the co-channel interference exists. Therefore, it is necessary to determine precisely whether or not the co-channel interference exists according to the channel condition.

As a conventional co-channel interference canceler, U.S. Pat. No. 5,546,132 discloses a detector for detecting the NTSC co-channel interference during the entire period of the received data without using the data field sync reference pattern. Additionally, U.S. Pat. No. 5,594,496 discloses a detector for generating a subtraction signal by comb-filtering a received signal including a field sync of successive fields, and comparing the subtraction signal passed through the comb filter with a subtraction signal which does not pass the comb filter, to remove the NTSC co-channel interference and other interferences according to the result of the comparison.

SUMMARY OF THE INVENTION

It is an object of the present invention to provide a co-channel interference canceler for determining precisely whether or not a co-channel interference rejection filter operates, using an error rate between a received signal and a reference signal, and removing the co-channel interference.

It is another object of the present invention to provide a method for driving a co-channel interference canceler including a co-channel interference rejection filter, using an error rate between a received signal and a reference signal.

To achieve the first object, there is provided a co-channel interference canceler comprising a co-channel interference rejection filter, a driving signal generator and a selector. The co-channel interference rejection filter removes co-channel interference from a first input signal, to provide a second input signal. The driving signal generator calculates error rates of each of the first and second input signals, with respect to a reference signal, and generating a driving signal based on the calculated error rates, and the selector selects one of the first and second input signals, according to the driving signal.

To achieve the second object, there is provided a method for driving a co-channel interference canceler, the method comprising the steps of filtering a first input signal using the co-channel interference rejection filter to output a second input signal. Next, error rates of each of the first and second input signals, with respect to a reference signal, are calculated, and a driving signal is generated based on the calculated error rates. One of the first and second input signals is then selected according to the driving signal.

BRIEF DESCRIPTION OF THE DRAWINGS

The above objects and advantages of the present invention will become more apparent by describing in detail preferred embodiments thereof with reference to the attached drawings in which:

FIGS. 2A through 2D are diagrams showing the frequency characteristics of a comb filter shown in FIG. 1, according to the locations of the NTSC carrier;

DETAILED DESCRIPTION OF THE INVENTION

Figure 3:
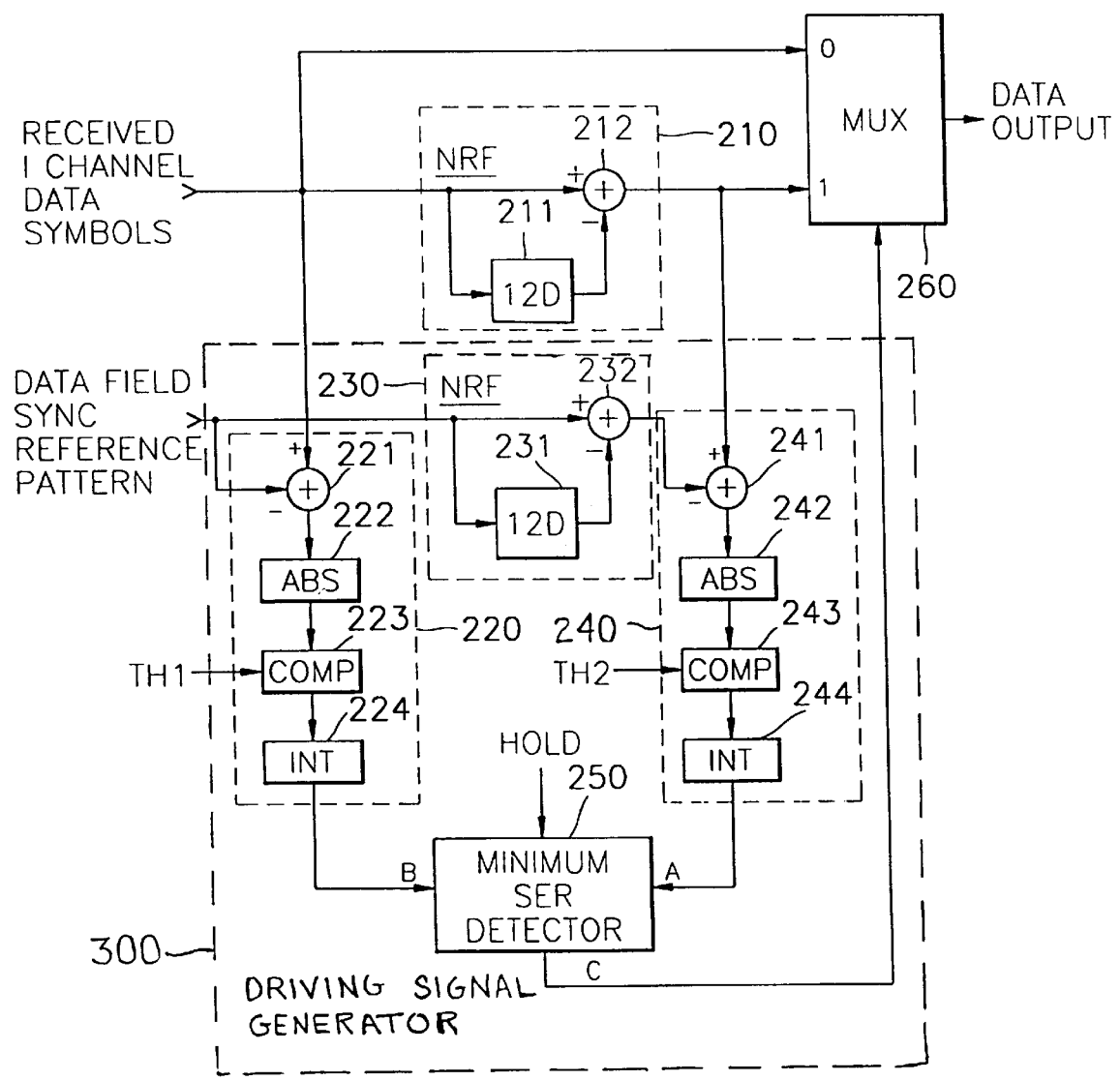
FIG. 3 is a circuit diagram of a co-channel interference canceler according to a preferred embodiment of the present invention.

As shown in FIG. 3, a co-channel interference canceler according to the present invention includes an NTSC rejection filter (NRF) 210, a driving signal generator 300 and a selector (MUX) 260. The NTSC rejection filter (NRF) 210 removes co-channel interference from a symbol data being received. The driving signal generator 300 generates a driving signal (C) selecting a path having the minimum symbol error rate (SER) by comparing a first path with a second path. The first path is for calculating an SER between a received field sync and a previously stored field sync reference pattern. The second path is for calculating an SER between the field sync of the received data symbol passed through the NRF 210 and the field sync reference pattern passed through the NRF 230. The selector (MUX) 260 selects the received data symbol, or the data symbol passed through the NRF 210, according to the driving signal (C).

The driving signal generator 300 includes a first SER calculator 220, an NRF 230, a second SER calculator 240 and a minimum SER detector 250. The first SER calculator 220 is for calculates an SER (B) between the field sync as a received known signal and the field sync reference pattern as a previously stored reference signal. The NRF 230 performs an NRF process on the field sync reference pattern. The second SER calculator 240 calculates an SER (A) between the received field sync passed through the NRF 210 and the field sync reference pattern passed through the NRF 230. The minimum SER detector 250 selects the lesser of the first SER value (B) (calculated by the first SER calculator 220) and the second SER value (A) (calculated by the second SER calculator 240) to generate the driving signal (C). Here, the first SER calculator 220 is designated as the first path, and the NRF 230 and the second SER calculator 240 are designated as the second path.

Next, the operation of the co-channel interference canceler of FIG. 3 will be described with reference to FIGS. 4 through 6. In FIG. 3, the NRFs 210 and 230 each comprise a comb filter for convenience of explanation. However, other co-channel interference rejection filters such as a notch filter or a finite impulse response (FIR) filter may be used.

The first SER calculator 220 includes a first subtractor 221, a first absolute calculator (ABS) 222, a first comparator (COMP) 223 and a first integrator (INT) 224. The first subtractor 221 subtracts the previously stored field sync reference pattern from the received data symbol including a field sync. The first absolute calculator (ABS) 222 calculates the absolute value of the output of the first subtractor 221. The first comparator (COMP) 223 compares the absolute value, output from the first absolute calculator 222, with a first threshold value (TH1), to output a logic "1" indicative of a symbol error if the absolute value is greater than or equal to the first threshold (TH1). The first integrator (INT) 224 integrates the output of the first comparator 223 over a first predetermined period (i.e., a period corresponding to 511PN (pseudo number) as a known signal of the field sync segment) to generate the first SER value (B). The second SER calculator 240 includes a second subtractor 241, a second absolute calculator (ABS) 242, a second comparator (COMP) 243 and a second integrator (INT) 244. The second subtractor 241 subtracts the field sync reference pattern passed through the NRF 230, from the received data symbol including the field sync passed through the NRF 210. The second absolute calculator (ABS) 242 calculates the absolute value of the output of the second subtractor 241. The second comparator (COMP) 243 compares the absolute value provided by the second absolute calculator 242 with a second threshold value (TH2), and generates a logic "1" indicative of a symbol error if the absolute value is greater than or equal to the second threshold value (TH2). The second integrator (INT) 244 integrates the output of the second comparator 243 over a first predetermined period to generate the second SER value (A).

Here, a reference signal generator may comprise a logic circuit for generating the field sync reference pattern for a first predetermined period. Alternatively, a memory such as a ROM may comprise the reference signal generator. However, a reference signal generator used in a block of a receiver, for processing a signal using a reference signal, is commonly used.

In addition, when the symbol locations of a reference signal are ±5, the existence of the input signal at 5−a and 5+a indicates that no error exists, so that the first threshold value (TH1) provided to the first comparator 223 becomes "a." This is because only the symbol values +5 and −5 exist in the field sync interval (i.e., when the input signal has 8 levels). Furthermore, if the symbol locations of the reference signal are ±10 and 0, the existence of the input signal at 10−b and 10−b indicates that no error exists, so that the second threshold value (TH2) provided to the second comparator 243 becomes "b". This is because symbol values +10, 0 and −10 exist in the field sync interval when the input signal has passed through the NRF 210 (i.e., when the input signal has 15 levels). Here, a and b are weights used for determining the reference level.

Figure 4:
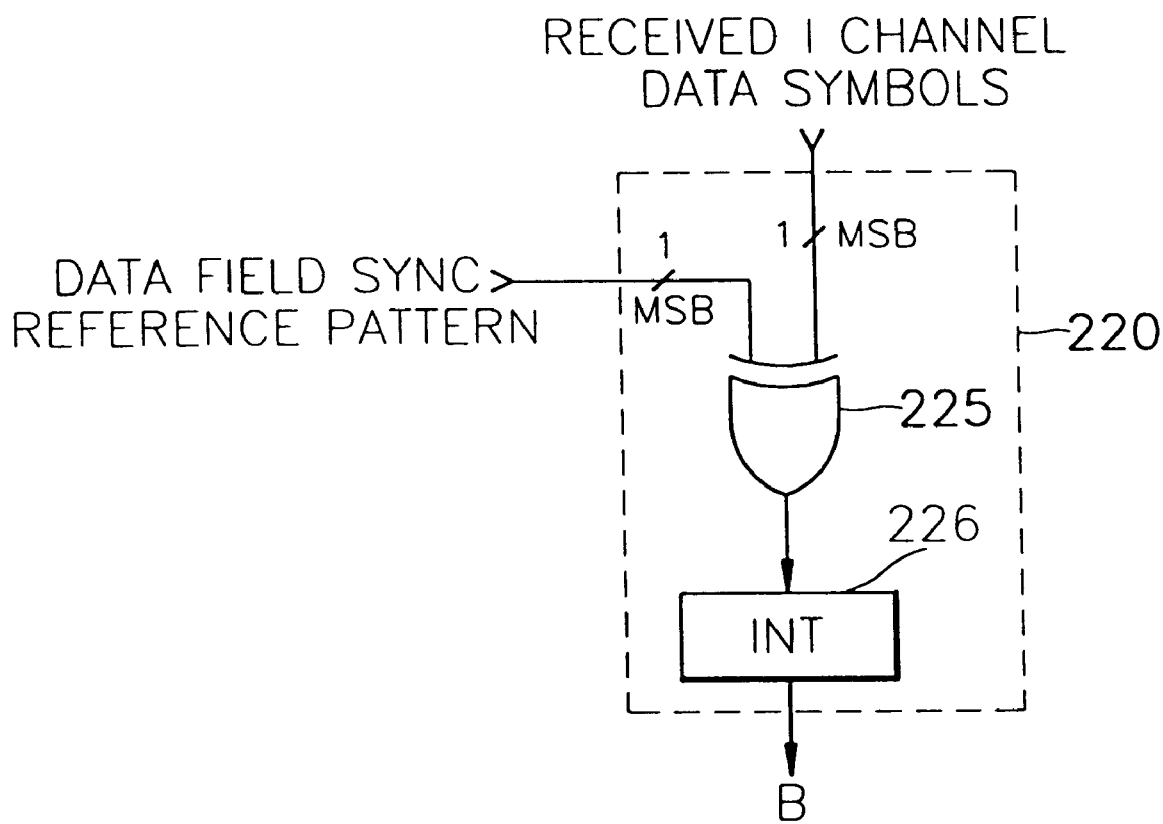
FIG. 4 is a circuit diagram of an example of the first SER calculator of FIG. 3.

Additionally, the first SER calculator 220 may be further simplified using a sign bit as shown in FIG. 4. In FIG. 4, since a reference signal is limited to two levels (three levels when being processed by the NRF), the error rate can be obtained only by determining whether or not the signs are equal. An exclusive OR gate 225 of the first SER calculator 220 performs an exclusive OR operation on the most significant bit (MSB) of the received field sync and the MSB of the field sync reference pattern. If the result is a logic "1" indicative of error, the result is then integrated by the integrator 226 over a first predetermined period. In the case of the path via the NRF, having three levels, the second SER calculator 240 cannot calculate the error rate by only a sign bit. Thus, the error rate is obtained using the method illustrated in FIG. 4, but based on the upper two bits. The exclusive OR gate 225 may be designated as a symbol error determiner.

The minimum SER detector 250 of FIG. 3 compares the first SER value (B), calculated by the first SER calculator 220, with the second SER value (A), calculated by the second SER calculator 240, to generate a driving signal (C) according to the result of the comparison. Here, the driving signal (C), representing whether or not an NTSC signal exists, has a logic "1" when the NTSC signal exists and a logic "0" when the NTSC signal does not exist.

The structure of the minimum SER detector 250 may be implemented using hardware based on the logic structure, or using software. In the present invention, when the minimum SER detector 250 is implemented using hardware based on the logic structure, the minimum structure is a comparator.

Figure 5:
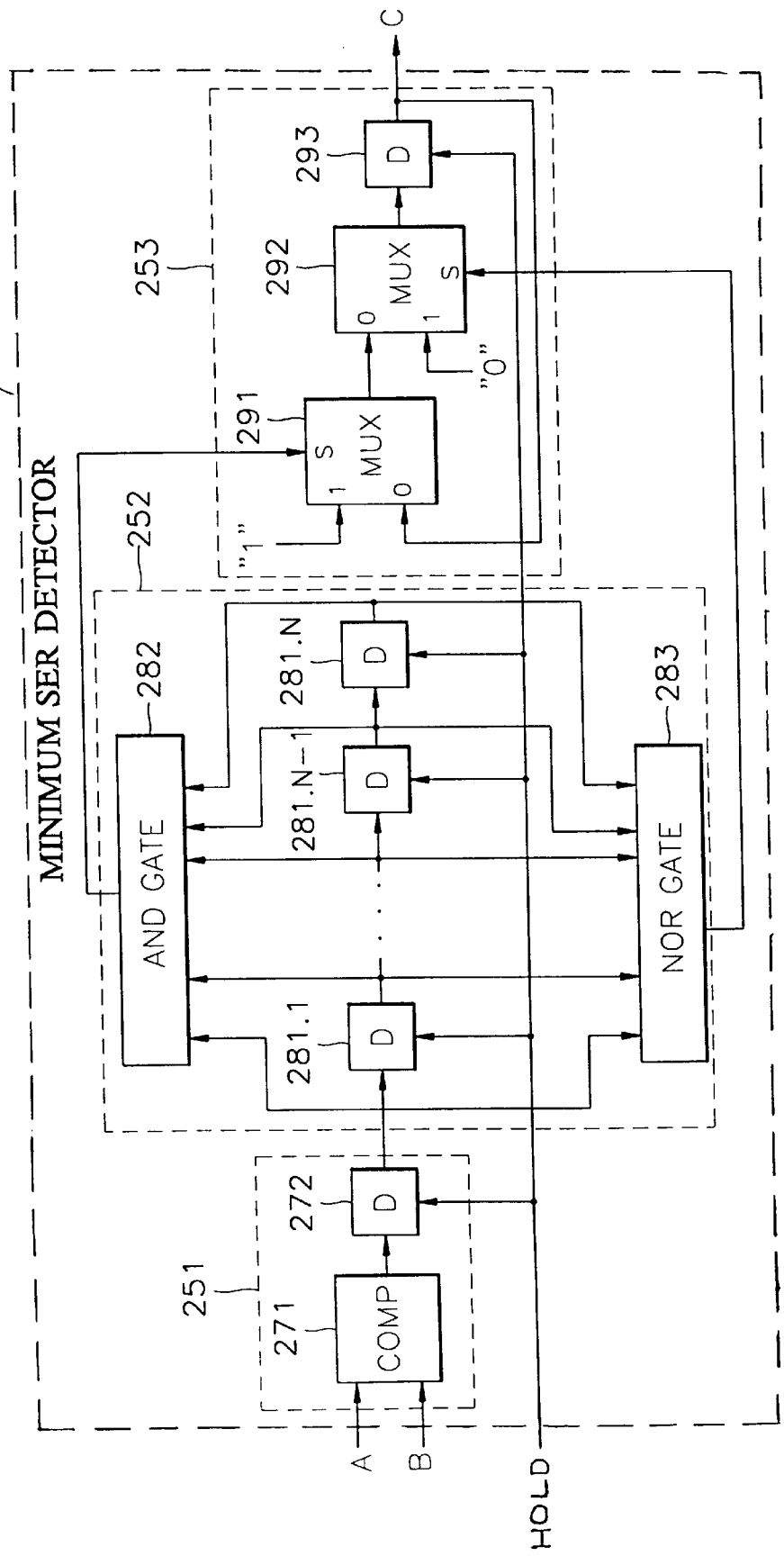
FIG. 5 is a detailed circuit diagram of an example of the minimum SER detector of FIG. 3.

FIG. 5 is a circuit diagram of an example of the minimum SER detector 250 of FIG. 3, which is implemented using hardware based on the logic structure. In order to obtain a reliable driving signal, the driving signal (C) is changed only when a first path, in which a continuous co-channel interference filtering is not performed for a second predetermined period (here, a period of N fields), or a second path, in which a co-channel interference rejection filtering is performed, is selected. In other cases, it is set for the driving signal to have the previous value. Accordingly, reliability of the selector 260 of FIG. 3 can be increased, thereby maintaining a constant path, and avoiding the bad effects caused by frequently changing the selected path.

Thus, as shown in FIG. 5, the minimum SER detector 250 includes a comparison circuit 251, a holding detection circuit 252, and a signal correction circuit 253. The comparison circuit 251 compares the first SER value (B) with the second SER value (A) to hold a comparison signal "1" or "0" according to a hold signal (HOLD) of FIG. 6B. The holding detection circuit 252 determines whether the comparison signal of the comparison circuit 251 is held for a second predetermined period. The signal correction circuit 253 selects the value maintained at the holding detection circuit 252 for the second predetermined period, and holds the previous value as before if the value is not maintained for the second predetermined period.

Figures 6A, 6B:
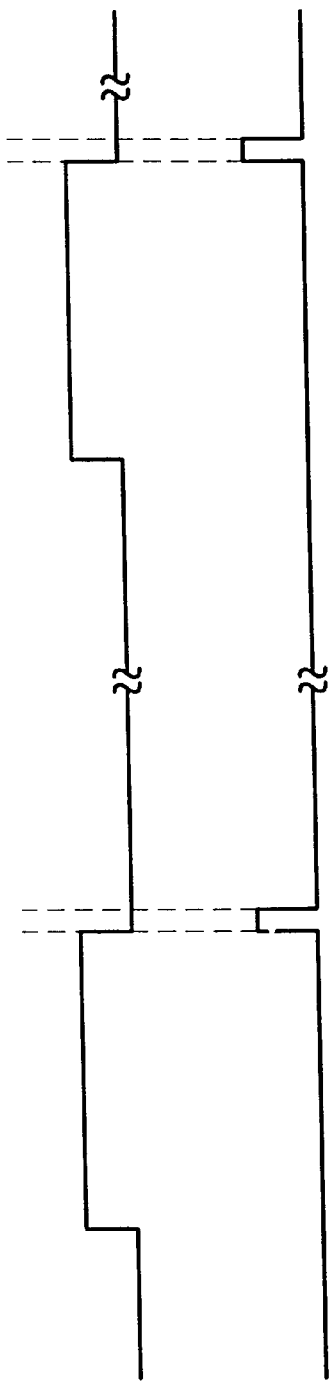
FIGS. 6A and 6B are timing diagrams relating to the minimum SER detector of FIG. 5.

Here, the comparison circuit 251 includes a comparator 271 and a D flip-flop 272. The comparator 271 compares the first SER value (B) provided by the first SER calculator 220 of FIG. 3 with the second SER value (A) provided by the second SER calculator 240. The D flip-flop 272 holds the output of the comparator 271 according to the hold signal HOLD. As shown in FIG. 6B, the hold signal is a logic "high" at a clock pulse after the first predetermined period of FIG. 6A in which the received field sync and the field sync reference pattern are compared.

The holding detection circuit 252, which is connected to the comparison circuit 251, includes N D flip-flops 281.1~281.N, an AND gate 282 and a NOR gate 283. The AND gate 282 performs AND-operations on the N output signals of the D it flip-flops 281.1~281.N. The NOR gate 283 performs NOR-operations on the N output signals of the D flip-flops 281.1~281.N.

The signal correction circuit 253 includes a first multiplexer 291, a second multiplexer 292 and a D flip-flop 293. The first multiplexer 291 has a second input (1) receiving a logic "1", a first input (0) receiving a driving signal (C) being fed back, and a selection input (s) connected to the AND gate 282. The second multiplexer 292 has a first input (0) connected to the output of the first multiplexer 291, a second input (1) receiving a logic "0", and a selection input (s) connected to the NOR gate 283. The D flip-flop 293 holds the output of the second multiplexer 292 according to the hold signal (HOLD).

The operation of the minimum SER detector 250 having the above described structure is as follows. Briefly, the minimum SER detector 250 compares the first SER value B with the second SER value A, to generate the driving signal (C) only when N compared values are all 0 or 1.

That is, the comparison circuit 251 compares the first SER value B with the second SER value A to output "0" when A>B, and "1" when A≦B. The N serially connected D flip-flops 281.1~281.N continuously shift the output signal of the comparison circuit 251 in response to the hold signal (HOLD). When all N outputs of the D flip-flops 281.1~281.N are logic "1", the AND gate 282 provides a logic "1" to the selection end (s) of the first multiplexer 291. When all N outputs of the D flip-flops 281.1~281.N are logic "0", the NOR gate 283 provides a logic "1" to the selection end (s) of the second multiplexer 292.

When the second SER value (A) is greater than or equal to the first SER value (B) (i.e., NTSC co-channel interference exists), the output of the comparison circuit 251 becomes a logic "1". When the output of the comparison circuit 251 is continuously maintained for N comparison intervals, the output of the AND gate 282 becomes a logic "1", and the output of the NOR gate is a logic "0". Accordingly, the first multiplexer 291 selects the logic "1" provided to the second input (1), and the second multiplexer 292 selects the first input (0) to input the logic "1" which is the output of the first multiplexer 291 to the D flip-flop 293. Thus, a driving signal (C) of a logic "1" is provided by the D flip-flop 293. The driving signal of the logic "1" is applied to the selector 260 of FIG. 3, and the selector 260 selects the data symbol passed through the NRF 210 according to the driving signal (C).

Consequently, the generation of a driving signal, for driving the selector 260, by the minimum SER detector 250 can be expressed by the following formula (1).

$$\text{If } A(k) \geq B(k) \text{ and } \sum_{i=1}^{N-1} C(k) = 0 \quad (1)$$

$$\text{Else if, } A(k) < B(k) \text{ and } \sum_{i=1}^{N-1} C(k-i) = N-1, \quad C(k) = 1$$

$$\text{Otherwise } C(k) = C(k-1)$$

Figure 7:
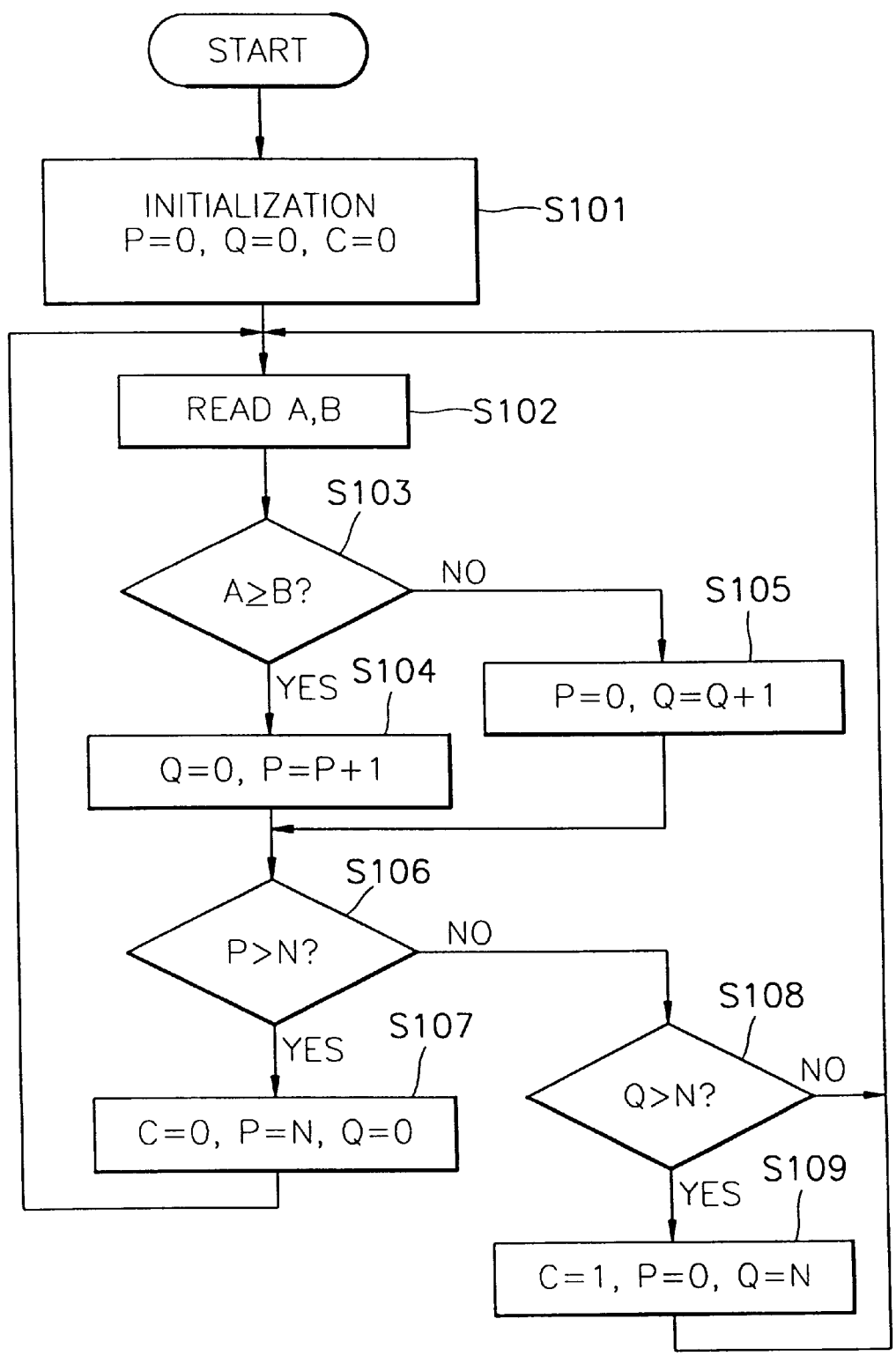
FIG. 7 is a flowchart illustrating the generation of a driving signal for controlling a co-channel interference removing canceler when the minimum SER detector of FIG. 5 is implemented using a microprocessor.

FIG. 7 is a flowchart illustrating the generation of a driving signal for the selector 260 using a microprocessor. Briefly, in the steps S101~S109 of FIG. 7, it is detected whether the continuous N signals are all the same as each other using two variables P and Q, and the result is provided as a driving signal (C).

In FIG. 7, two variables P and Q, and a driving signal (C) are initialized in the step S101, and the first SER value (B) and the second SER value (A) are read from the first and second SER calculators 220 and 240 in the step S102. In the step S103, the first SER value (B) is compared with the second SER value (A). Then, only the variable P is increased by 1 if the second SER value (A) is greater than or equal to the first SER value (B) (S104). Otherwise, the variable Q is increased by 1 (S105).

Next, the variable P and the number of repeating times N are compared (S106). If the variable P is greater than the repeating frequency N, the driving signal (C) becomes logic "0". Simultaneously, the variable P is set to N and the variable Q is set to "0" (S107), and then the program returns to the step S102. If the variable P is less than or equal to the repeating frequency N, the variable Q and the repeating frequency N are compared (S108). If the variable Q is greater than the repeating frequency N, the driving signal becomes logic "1." Simultaneously, the variable P is set to "0" and the variable Q is set to N (S109), and then the program returns to the step S102. If the variable Q is less than or equal to the repeating frequency N in the step S108, the program returns to the step S102.

Figure 1:
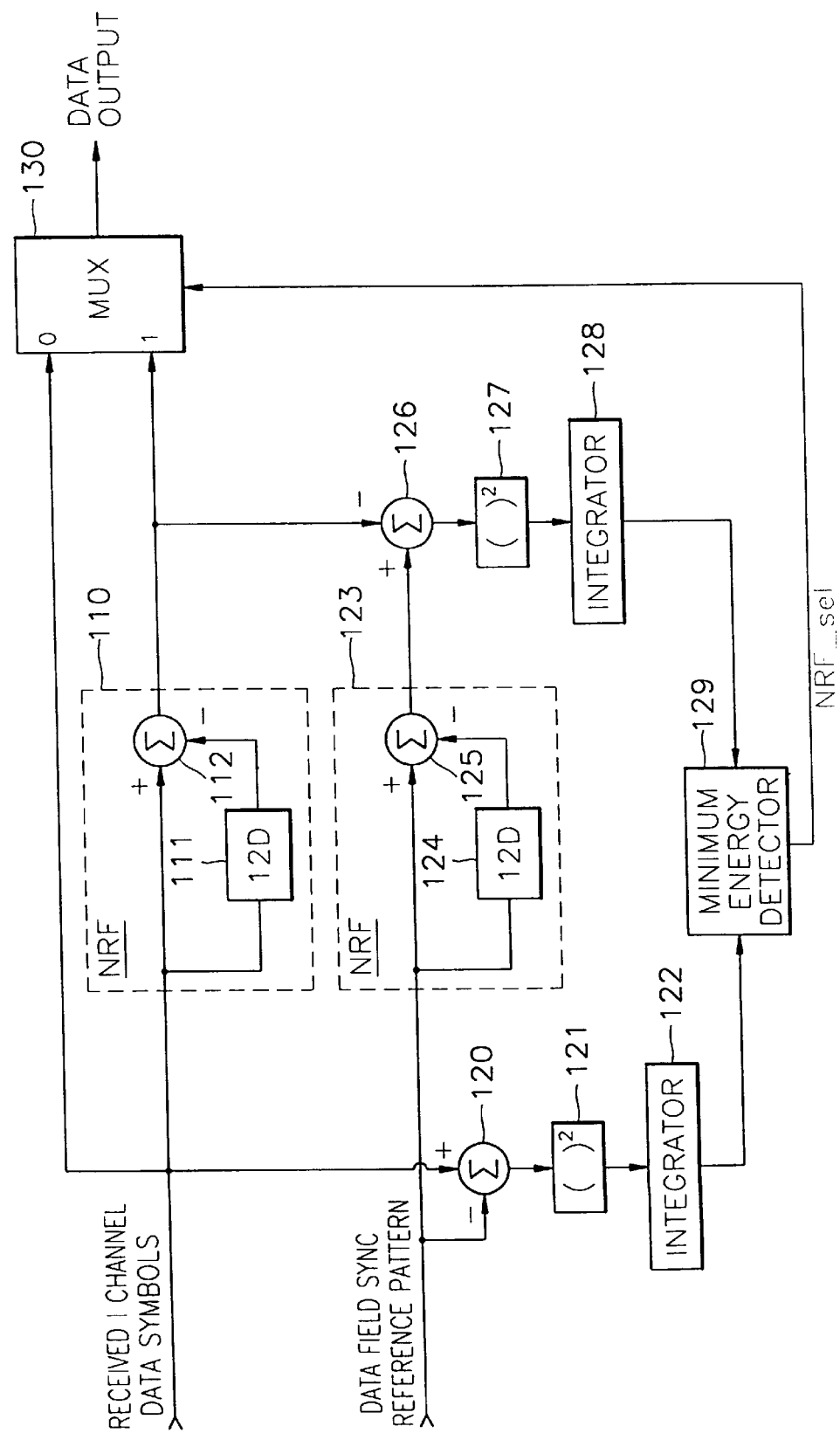
FIG. 1 is a circuit diagram of a conventional co-channel interference canceler.

The example of the present invention, illustrated with reference to FIGS. 6 and 7, is not limited to the above, and further modifications and alterations will occur to those skilled in the art, to implement hardware and software structures capable of controlling the operation of the NRF. Further, the holding detection circuit 252 and the signal correction circuit 253 of the minimum SER detector of FIG. 5 can be applied to a co-channel interference canceler including a comparator for comparing the values of two paths. For example, the holding detection circuit 252 and the signal correction circuit 253 can be applied to both the minimum energy detector 129 of FIG. 1, as suggested by the ATSC, and the comparator disclosed in U.S. Pat. No. 5,594, 496.

The co-channel interference canceler according to the present invention can remove co-channel interference using a symbol error rate, while increasing reliability and simplifying hardware. Further, in the driving method therefor of the present invention, a co-channel interference rejection filter is driven based on a symbol error rate, providing a good basis for the decision performed after the co-channel interference canceler. Additionally, to select a path by comparing the symbol error rate of the path passed through the NRF with the symbol error rate of the path which does not pass through the NRF, the path is changed only in the case when a selected path is maintained for a predetermined period, thereby providing reliable decision and a stable path.

What is claimed is:

1. A co-channel interference canceler comprising:
   a co-channel interference rejection filter for removing co-channel interference from a first input signal to generate a second input signal;
   a driving signal generator for calculating error rates of said first and second input signals with respect to a reference signal, and generating a driving signal based on the calculated error rates; and
   a selector for selecting one of said first and second input signals, according to said driving signal,
   wherein said driving signal generator comprises:
   a first calculator for calculating a symbol error rate (SER) between said first input signal and a previously stored reference signal, for a first predetermined period to generate a first SER value;
   a second calculator for calculating an SER between said second input signal and said reference signal, for said first predetermined period to generate a second SER value; and
   a minimum SER detector for comparing said first SER value with said second SER value to generate the driving signal based on the smaller of said first and second SER values.

2. The co-channel interference canceler of claim 1, wherein said first calculator comprises:
   a first subtractor for subtracting a field sync reference pattern, being generated for said first predetermined period, from said first input signal;
   a first absolute calculator for calculating an absolute value of an output of the first subtractor to generate a first absolute value;
   a first comparator for comparing said first absolute value with a first threshold value to generate a first comparison signal; and a first integrator for integrating said first comparison signal over said first predetermined period to generate said first SER value.

3. The co-channel interference canceler of claim 1, wherein said first calculator comprises:
a first symbol error determiner for comparing a sign bit of said first input signal with a sign bit of a field sync reference pattern being generated for said first predetermined period, to generate a first control signal indicative of a symbol error; and
a first integrator for integrating said first control signal over said first predetermined period to generate said first SER value.

4. The co-channel interference canceler of claim 2, wherein said second calculator comprises:
a second subtractor for subtracting said field sync reference pattern, being generated for said first predetermined period, from the second input signal;
a second absolute calculator for calculating an absolute value of an output of the second subtractor to generate a second absolute value;
a second comparator for comparing said second absolute value with a second threshold value to generate a second comparison signal; and
a second integrator for integrating said second comparison signal over said first predetermined period to generate said second SER value.

5. The co-channel interference canceler of claim 3, wherein said second calculator comprises:
a second symbol error determiner for comparing one or more upper bits of said first input signal with one or more upper bits of said field sync reference pattern being generated for said first predetermined period, to generate a second control signal representing a symbol error; and
a second integrator for integrating said second control signal over said first predetermined period to generate said second SER value.

6. The co-channel interference canceler of claim 4, wherein said first predetermined period is a period corresponding to a known signal within a field sync segment of the first and second input signals.

7. The co-channel interference canceler of claim 1, wherein said minimum SER detector comprises a comparator for comparing said first SER value with said second SER value to generate said driving signal.

8. The co-channel interference canceler of claim 1, wherein said minimum SER detector comprises:
a comparison circuit for comparing said first SER value with said second SER value to generate a comparison signal;
a holding detection circuit for determining whether said comparison signal is held for a second predetermined period; and
a signal correction circuit for selecting a value maintained in said holding detection circuit for said second predetermined period, and for holding a previous value when a value is not maintained for said second predetermined period.

9. The co-channel interference canceler of claim 8, wherein said second predetermined period is a period corresponding to N fields, where N is an integer.

10. The co-channel interference canceler of claim 9, wherein said holding detection circuit comprises:
N D flip-flops serially connected to said comparison circuit, for holding the comparison result according to a hold signal;
a first gate for detecting whether all of said N D flip-flops are providing output signals which are in a first logic state, to generate a first active signal; and
a second gate for detecting whether all of said N D flip-flops are providing output signals which are in a second logic state, to generate a second active signal.

11. The co-channel interference canceler of claim 10, wherein said signal correction circuit comprises:
a first selector for selecting either said driving signal being fed back or a set first logic value, according to said first active signal; and
a second selector for selecting either a set second logic value or the selection of the first selector, according to said second active signal, to generate said driving signal.

12. The co-channel interference canceler of claim 10, wherein said hold signal is active in a clock pulse period after said first predetermined period.

13. The co-channel interference canceler of claim 1, wherein said minimum SER detector comprises a microprocessor for comparing said first SER value with said second SER value to generate the driving signal based on the compared result.

14. A co-channel interference canceler for generating a driving signal to select between a first input signal which is not filtered by a co-channel interference rejection filter and a second input signal which is filtered by the co-channel interference rejection filter, said co-channel interference canceler comprising:
a comparison circuit for comparing error rates of first and second input signals, with respect to a reference signal, for a first predetermined period to generate a comparison signal;
a holding detection circuit for determining whether said comparison signal is maintained for a second predetermined period; and
a signal correction circuit for selecting a value maintained in said holding detection circuit for said second predetermined period, and for holding a previous value when the value is not maintained in said holding detection circuit for said second predetermined period.

15. The co-channel interference canceler of claim 14, wherein said first predetermined period is a period corresponding to a known signal within a field sync segment of said first and second input signals.

16. The co-channel interference canceler of claim 15, wherein said second predetermined period is a period corresponding to N fields, where N is an integer.

17. A method for driving a co-channel interference canceler having a co-channel interference rejection filter, the method comprising the steps of:
(a) filtering a first input signal using the co-channel interference rejection filter to generate a second input signal;
(b) calculating error rates of said first and second input signals with respect to a reference signal, and generating a driving signal based on the calculated error rates; and
(c) selecting one of said first and second input signals according to the driving signal, wherein the step (b) comprises the steps of:
(b1) calculating a symbol error rate (SER) between said first input signal and a previously stored reference signal, for a first predetermined period, to generate a first SER value;
(b2) calculating an SER between said second input signal and said reference signal, for the first predetermined period, to generate a second SER value; and (b3) comparing said first SER value with said second SER value to generate said driving signal based on the smaller value of said first and second SER values.

18. The method of claim 17, wherein in the step (b1), said first SER value is obtained by comparing a sign bit of said first input signal with a sign bit of said previously stored reference signal, for said first predetermined period.

19. The method of claim 17, wherein in the step (b2), said second SER value is obtained by comparing one or more upper bits of said first input signal, with one or more upper bits of said previously stored reference signal, for said first predetermined period.

20. The method of claim 17, wherein said first predetermined period is a period corresponding to a known signal within a field sync segment of said first and second input signals.

21. The method of claim 17, wherein the step (b3) comprises the steps of:

(b31) comparing said first SER value with said second SER value to generate a comparison signal;

(b32) determining whether said comparison signal is held for a second predetermined period; and (b33) selecting a value maintained in the step (b32) for said second predetermined period, and holding a previous value when said value is not maintained for said second predetermined period.

22. The method of claim 17, wherein said second predetermined period is a period corresponding to N fields, where N is an integer.

* * * * *